United States Patent
Kishi et al.

(10) Patent No.: US 10,371,203 B2
(45) Date of Patent: Aug. 6, 2019

(54) CAP FOR MOTION GUIDE APPARATUS

(71) Applicant: THK CO., LTD., Tokyo (JP)

(72) Inventors: Hiroyuki Kishi, Tokyo (JP); Satoshi Kashiwagura, Tokyo (JP); Ryuji Furusawa, Tokyo (JP); Atsuhiro Tanaka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/082,405

(22) PCT Filed: Mar. 23, 2017

(86) PCT No.: PCT/JP2017/011827
§ 371 (c)(1),
(2) Date: Sep. 5, 2018

(87) PCT Pub. No.: WO2017/164330
PCT Pub. Date: Sep. 28, 2017

(65) Prior Publication Data
US 2019/0107150 A1 Apr. 11, 2019

(30) Foreign Application Priority Data

Mar. 25, 2016 (JP) .................................. 2016-061077
Mar. 23, 2017 (JP) .................................. 2017-057603

(51) Int. Cl.
F16C 29/08 (2006.01)
F16C 29/06 (2006.01)

(52) U.S. Cl.
CPC .......... *F16C 29/08* (2013.01); *F16C 29/0671* (2013.01)

(58) Field of Classification Search
CPC ................ F16C 29/004; F16C 29/0647; F16C 29/0671; F16C 29/08; F16C 29/082; F16C 33/726; F16B 37/14
See application file for complete search history.

(56) References Cited

U.S. PATENT DOCUMENTS

2012/0073396 A1    3/2012   Kawaguchi et al.
2014/0199133 A1    7/2014   Hsu

FOREIGN PATENT DOCUMENTS

CN    102414462 A    4/2012
CN    202468705 U    10/2012
(Continued)

OTHER PUBLICATIONS

International Search Report dated Jun. 20, 2017, issued in counterpart International Application No. PCT/JP2017/011827 (2 pages).
(Continued)

*Primary Examiner* — Alan B Waits
(74) *Attorney, Agent, or Firm* — Westerman, Hattori, Daniels & Adrian, LLP

(57) ABSTRACT

A cap for a motion guide apparatus which can reduce generation of a burr and can also increase the fixing force. The cap of the present invention is for blocking a fastening member insertion hole of a guide rail of a motion guide apparatus. The cap includes a disc-shaped top surface portion, a cylindrical side surface portion hanging down from the top surface portion, and a plurality of protrusions provided on an outer peripheral surface of the side surface portion. The plurality of protrusions is apart from each other in a circumferential direction on the outer peripheral surface of the side surface portion, and is present at an upper end portion, or from the upper end portion to an axially middle portion, of the outer peripheral surface. A thickness of the side surface portion between the protrusions is less than a thickness of the top surface portion.

20 Claims, 15 Drawing Sheets

X-X CROSS-SECTIONAL VIEW

(56) References Cited

FOREIGN PATENT DOCUMENTS

| | | |
|---|---|---|
| CN | 202971574 U | 6/2013 |
| CN | 204459145 U | 7/2015 |
| DE | 813301 B | 9/1951 |
| DE | 102012206374 A1 | 10/2013 |
| JP | 2002-48138 A | 2/2002 |
| JP | 2002-227838 A | 8/2002 |
| JP | 2007-113671 A | 5/2007 |
| JP | 2007-192282 A | 8/2007 |
| JP | 2010-190317 A | 9/2010 |
| JP | 2013-137101 A | 7/2013 |
| JP | 2014-137140 A | 7/2014 |
| TW | M503494 U | 6/2015 |

OTHER PUBLICATIONS

Decision to Grant a Patent dated Feb. 27, 2018 issued in counterpart Japanese Patent Application No. 2017-057603, w/English translation (6 pages).
Notification of Reason for Refusal dated Oct. 24, 2017, issued in counterpart Japanese Patent Application No. 2017-057603, w/English translation (10 pages).
Office Action dated Feb. 22, 2019, issued in counterpart CN Application No. 201780016671.9, with English translation. (10 pages).
Office Action dated Mar. 21, 2019, issued in counterpart DE Application No. 112017001548.0, with English translation. (9 pages).

ENLARGED VIEW OF VIII PORTION

X-X CROSS-SECTIONAL VIEW

XIV-XIV CROSS-SECTIONAL VIEW

CAP FOR MOTION GUIDE APPARATUS

TECHNICAL FIELD

The present invention relates to a cap for blocking a fastening member insertion hole of a guide rail of a motion guide apparatus.

BACKGROUND ART

A motion guide apparatus is used to guide the linear motion (rectilinear or curvilinear motion) of a movable body such as a table. The motion guide apparatus includes a guide rail attached to a base, a carriage assembled to the guide rail so as to perform linear motion, and multiple rolling elements disposed between the guide rail and the carriage so as to perform rolling motion. When the carriage moves relatively to the guide rail, the multiple rolling elements perform rolling motion therebetween. The use of the rolling motion of the rolling elements allows a highly accurate, smooth guidance of the movable body.

Fastening member insertion holes are provided at constant pitch in a length direction to the guide rail. A fastening member such as a bolt for fastening the guide rail to the base is threaded through the fastening member insertion hole. When foreign substances such as dust are accumulated in the fastening member insertion hole, even a seal provided to the carriage cannot scrape out the foreign substances. In order to prevent foreign substances from entering the carriage and hindering smooth rolling motion of the rolling elements, the guide rail is attached by the fastening members to the base, and then the fastening member insertion holes of the guide rail are blocked by a cap (refer to, for example, Patent Literature 1).

A cap provided with a plurality of protrusions around a disc-shaped cap body is known as a known cap in Patent Literature 1. The cap is temporarily placed on the fastening member insertion hole, and then driven into the fastening member insertion hole using a hammer or the like. The protrusion of the cap is provided with interference. The cap is fixed by the interference to the fastening member insertion hole.

CITATION LIST

Patent Literature

Patent Literature 1: JP 2002-227838 A

SUMMARY OF INVENTION

Technical Problem

However, there is a problem with the known cap for a motion guide apparatus that when the cap is driven into the fastening member insertion hole, the protrusion is scraped and a burr is generated. Hence, the burr needs to be removed after the driving operation, which takes man-hours. If the interference of the protrusion is reduced to reduce the generation of a burr, the fixing force of the cap to the guide rail is reduced.

Hence, an object of the present invention is to provide a cap for a motion guide apparatus that can reduce the generation of a burr and can also increase the fixing force of the cap to a guide rail.

Solution to Problem

To solve the above problem, an aspect of the present invention is a cap for blocking a fastening member insertion hole of a guide rail of a motion guide apparatus, the cap for a motion guide apparatus including: a disc-shaped top surface portion; a cylindrical side surface portion hanging down from the top surface portion; and a plurality of protrusions provided on an outer peripheral surface of the side surface portion, wherein the plurality of protrusions is apart from each other in a circumferential direction on the outer peripheral surface of the side surface portion, and is present at an upper end portion, or from the upper end portion to an axially middle portion, of the outer peripheral surface, and a thickness of the side surface portion between the protrusions is less than a thickness of the top surface portion.

Advantageous Effects of Invention

According to an aspect of the present invention, the stiffness of the side surface portion of the cap is lower than the stiffness of the top surface portion. Accordingly, the side surface portion of the cap deforms elastically. A spring function is provided to the side surface portion of the cap. Hence, it is possible to reduce the generation of a burr and also increase the fixing force of the cap. Moreover, the protrusion is present at the upper end portion, or from the upper end portion to the middle portion, of the outer peripheral surface of the side surface portion. Accordingly, when the cap is temporarily placed on the fastening member insertion hole, the cap can be stabilized, and a spring function can also be provided to the side surface portion below the protrusion.

DESCRIPTION OF EMBODIMENTS

A cap for a motion guide apparatus according to embodiments of the present invention is described in detail hereinafter with reference to the accompanying drawings. However, the cap for a motion guide apparatus of the present invention can be embodied in various forms, and is not limited to the embodiments described in the description. The embodiments are provided with the intention of fully disclosing the description to enable those skilled in the art to fully understand the scope of the invention.

First Embodiment

Figure 1:
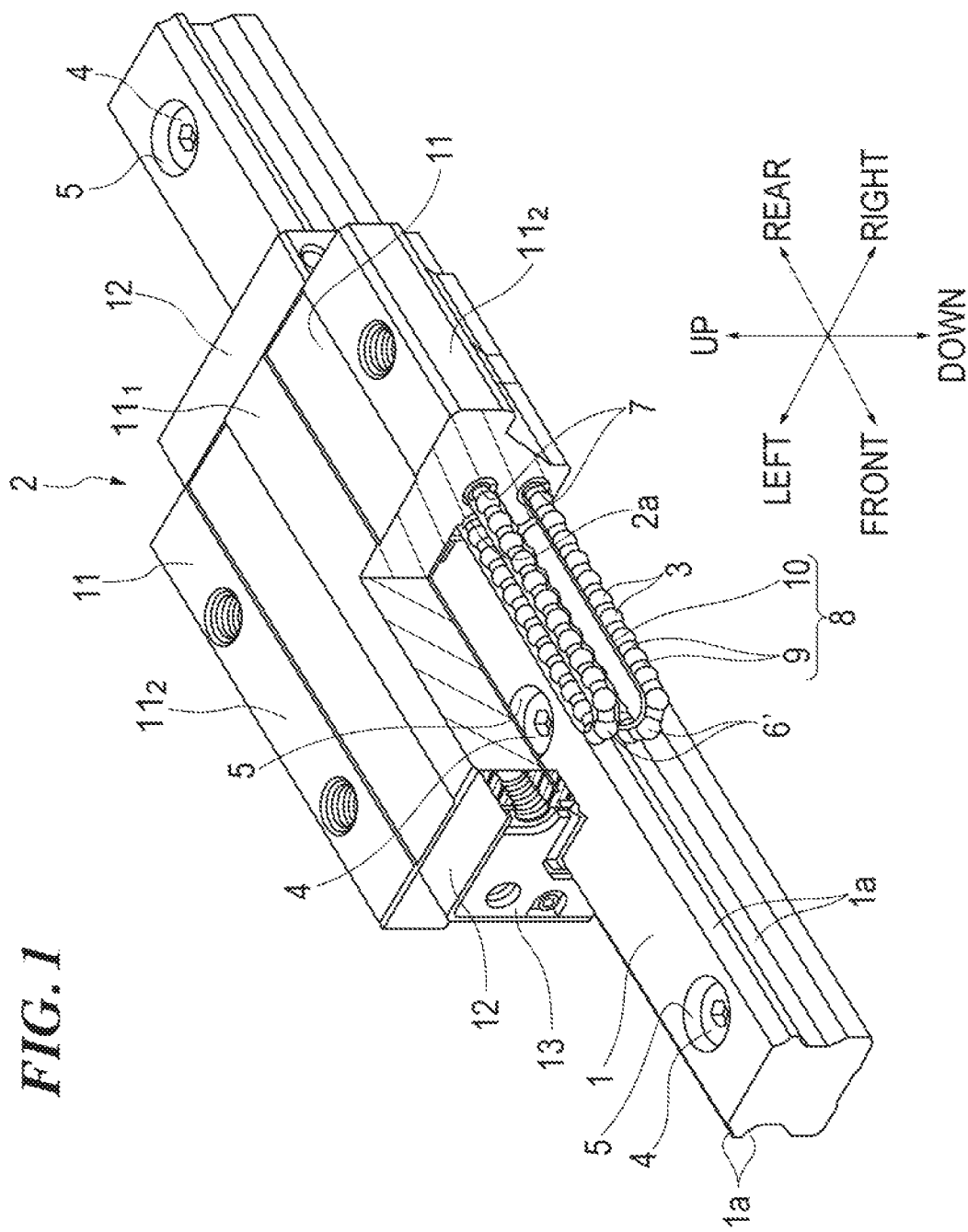
FIG. 1 is a perspective view of a motion guide apparatus into which a cap according to a first embodiment of the present invention is driven.
Figure 2:
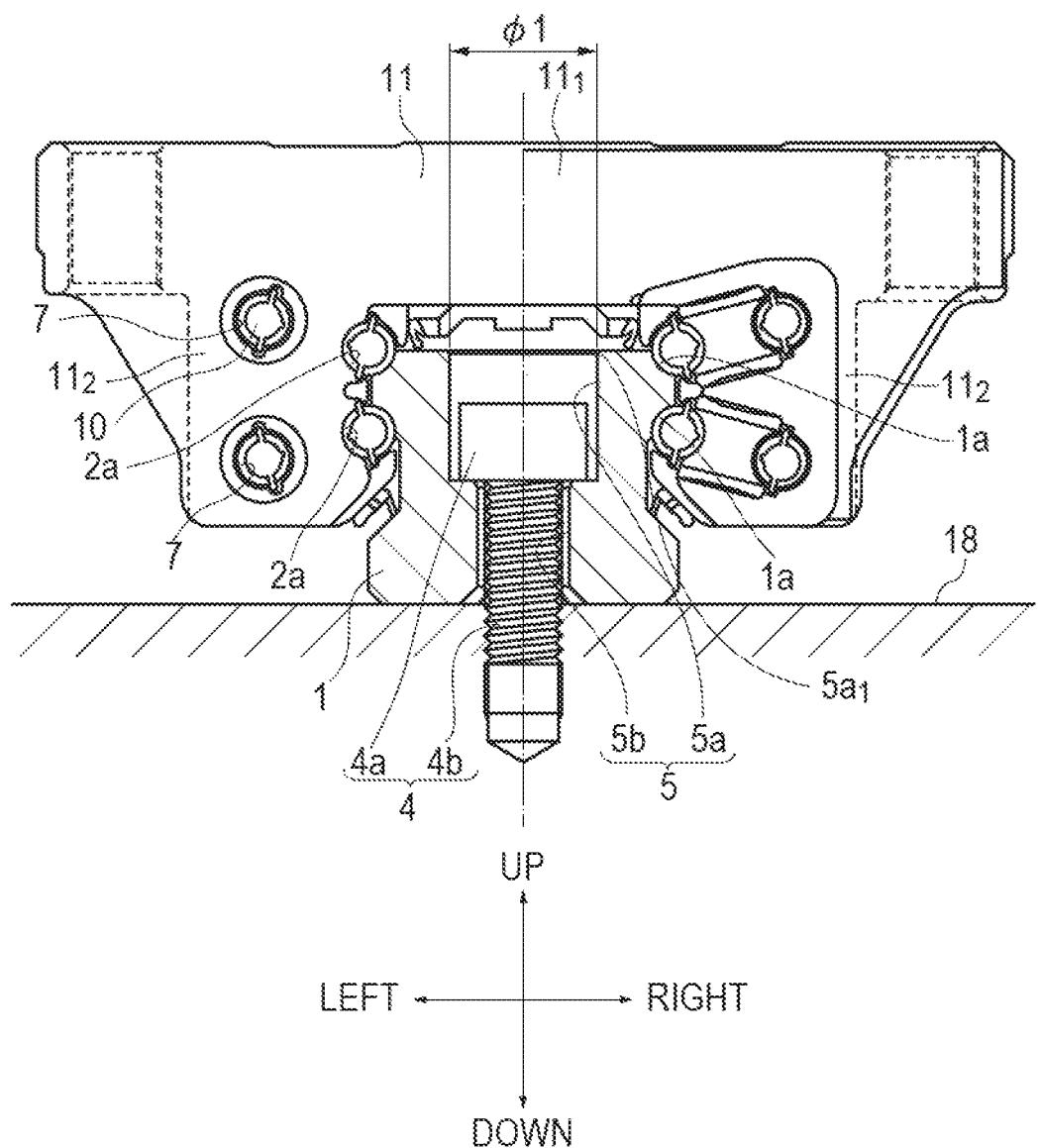
FIG. 2 is a front view of the motion guide apparatus.

The configuration of a motion guide apparatus into which a cap is driven is as follows: FIG. 1 illustrates a perspective view of the motion guide apparatus, and FIG. 2 illustrates a front view of the motion guide apparatus from which an endplate has been removed. The motion guide apparatus includes a guide rail 1 extending linearly in a length direction, and a carriage 2 assembled to the guide rail 1 via multiple rolling elements 3 such as balls or rollers so as to perform rectilinear motion in the length direction. The configuration of the motion guide apparatus is described below, using directions when the guide rail 1 is viewed from the length direction while being attached to a horizontal surface, that is, an up-and-down direction, a left-and-right direction, and a front-and-rear direction of FIGS. 1 and 2. However, the placement of the motion guide apparatus is not limited to this. Moreover, the same reference signs are assigned to the same components in the drawings.

As illustrated in FIG. 1, a plurality of fastening member insertion holes 5 (hereinafter simply referred to as the holes 5) is open on a top surface of the guide rail 1, spaced apart from each other in the length direction. A bolt 4 as a fastening member for fixing the guide rail 1 to a base is inserted into the hole 5. As illustrated in FIG. 2, a counterbore portion 5a with a larger diameter than a head 4a of the bolt 4, and a bolt insertion hole 5b that is slightly larger than a threaded portion 4b of the bolt 4 are concentrically formed in the hole 5. An inner diameter of the counterbore portion 5a is $\phi 1$. A chamfered portion $5a_1$ is provided at an inner edge of a top surface of the counterbore portion 5a (refer also to FIG. 9A). The counterbore portion 5a is set to be higher than the head 4a of the bolt 4 such that the bolt 4 is completely buried in the hole 5. The bolt 4 is threaded into the hole 5, and is screwed into a base 18. Accordingly, the head 4a of the bolt 4 sits on a bearing surface of the counterbore portion 5a of the guide rail 1 to fix the guide rail 1 to the base 18.

A movable body that performs linear motion, such as a table, is attached to a top surface of the carriage 2 using a bolt (not illustrated). FIGS. 1 and 2 illustrate a state where the bolt 4 is threaded into the hole 5 of the guide rail 1 and the bolt 4 is screwed into the base 18. The hole 5 is subsequently blocked by the cap. However, FIGS. 1 and 2 illustrate a state before the hole 5 is blocked by the cap.

As illustrated in FIG. 2, the guide rail 1 has a substantially square shape in cross section. A plurality of rolling element rolling portions 1a where the rolling elements perform rolling motion is formed in the top surface and a side surface of the guide rail 1. The rolling element rolling portion 1a is formed long and narrowly along the length direction of the guide rail 1.

As illustrated in FIG. 1, the carriage 2 includes a carriage body 11, and an endplate 12 provided on either end surface in a travel direction of the carriage body 11. The carriage body 11 includes a center portion $11_1$ facing the top surface of the guide rail 1, and a side wall portion $11_2$ hanging down from either of the left and right sides in a width direction of the center portion $11_1$ and facing either of the left and right side surfaces of the guide rail 1. Loaded rolling element rolling portions 2a each facing the rolling element rolling portion 1a of the guide rail 1 and unloaded return paths 7 parallel to the loaded rolling element rolling portions 2a are formed in the carriage body 11. An outer side of a turn-around path 6' that connects the loaded rolling element rolling portion 2a and the unloaded return path 7 is formed in the endplate 12.

The loaded rolling element rolling portion 2a, the unloaded return path 7, and the turn-around path 6' of the carriage 2 form a rolling element circulation path. The plurality of rolling elements 3 is arranged and housed in the rolling element circulation path. The plurality of rolling elements 3 is rotatably held in a chain by a retainer 8. The retainer 8 includes spacers 9 disposed between the rolling elements 3 and a band 10 coupling the spacers 9.

There is a gap of a U-shape in cross section between the guide rail 1 and the carriage 2 surrounding the guide rail 1. In order to block the gap, a seal 13 matching the outer shape of the guide rail 1 is attached on either end surface in the travel direction of the carriage 2. The seal 13 prevents foreign substances such as dust, dirt, and chips from entering the carriage 2 and adhering to the rolling elements 3.

When the motion guide apparatus is used in an environment where there is much dust, foreign substances are also accumulated in the hole 5 of the guide rail 1. The foreign substances accumulated in the hole 5 may not be able to be removed by the seal 13 that scrapes the top surface of the guide rail 1, and may enter the carriage 2. The foreign substances that have entered the carriage 2 may adhere to the rolling element rolling portion 1a and the loaded rolling element rolling portion 2a and hinder smooth rolling motion of the rolling element 3. In order to prevent it, the hole 5 of the guide rail 1 is covered with a cap 21.

Figure 3:
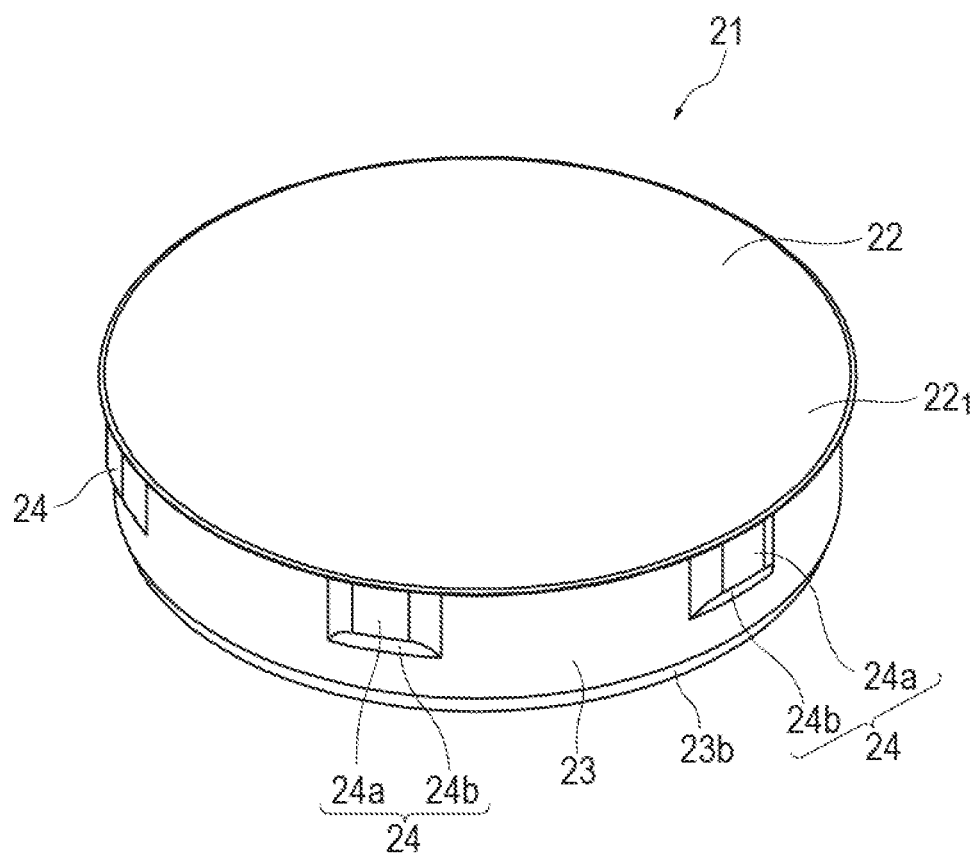
FIG. 3 is a perspective view of a top surface side of the cap according to the embodiment.
Figure 4:
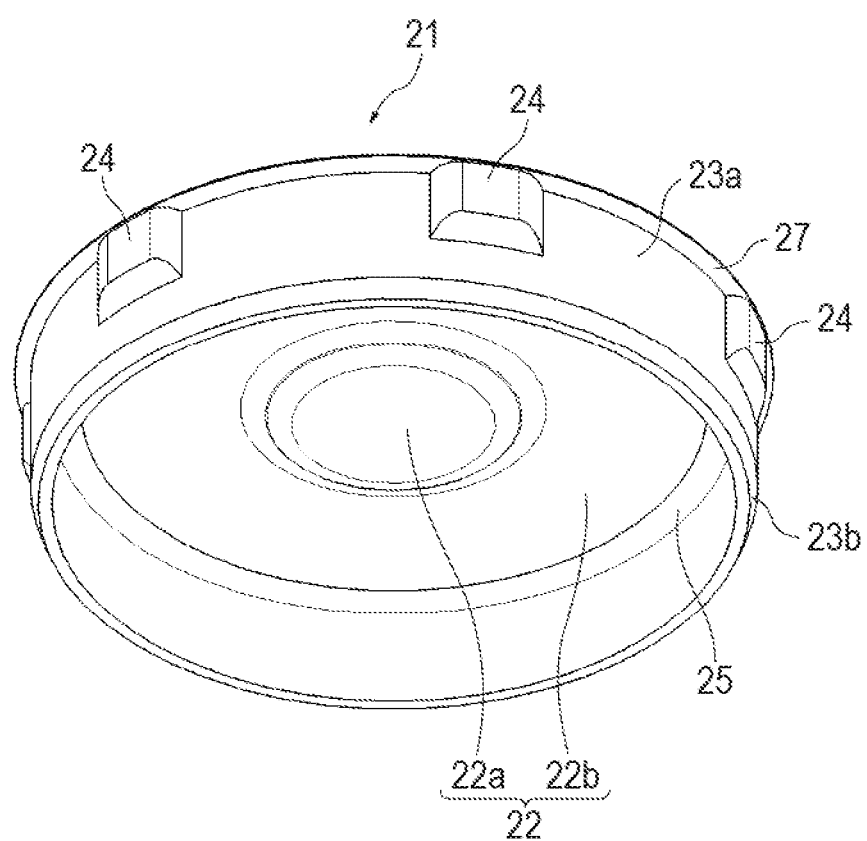
FIG. 4 is a perspective view of a bottom surface side of the cap according to the embodiment.

FIG. 3 illustrates a perspective view of a top surface side of the cap 21 according to the first embodiment of the present invention. FIG. 4 illustrates a perspective view of a bottom surface side of the cap 21 according to the first embodiment of the present invention. As illustrated in FIGS. 3 and 4, the cap 21 includes a disc-shaped top surface portion 22, a cylindrical side surface portion 23 hanging down from the top surface portion 22, and a plurality of protrusions 24 provided on an outer peripheral surface of the side surface portion 23. The cap 21 is a resin molded object. The top surface portion 22, the side surface portion 23, and the protrusions 24 are formed integrally. The configurations of the portions of the cap 21 are described below in turn.

As illustrated in FIGS. 3 and 4, the top surface portion 22 of the cap 21 has a disc shape. The side surface portion 23 hangs down from an edge of the top surface portion 22. As illustrated in a cross-sectional view of FIG. 6, the top surface portion 22 has a thick center portion 22a, and a peripheral portion 22b that is thinner than the center portion 22a. A top surface $22_1$ of the top surface portion 22 is formed flat except a top surface of a flange 27 described below.

Figure 5:
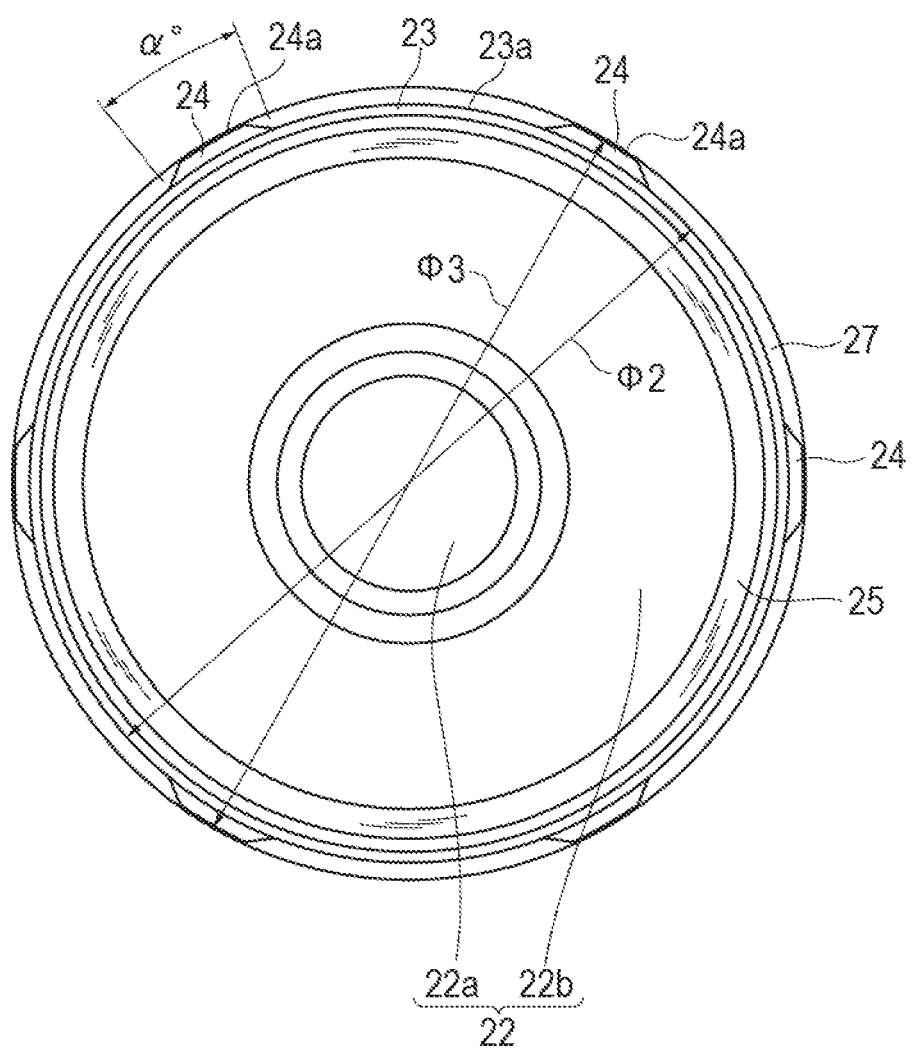
FIG. 5 is a bottom view of the cap according to the embodiment.
Figure 6:
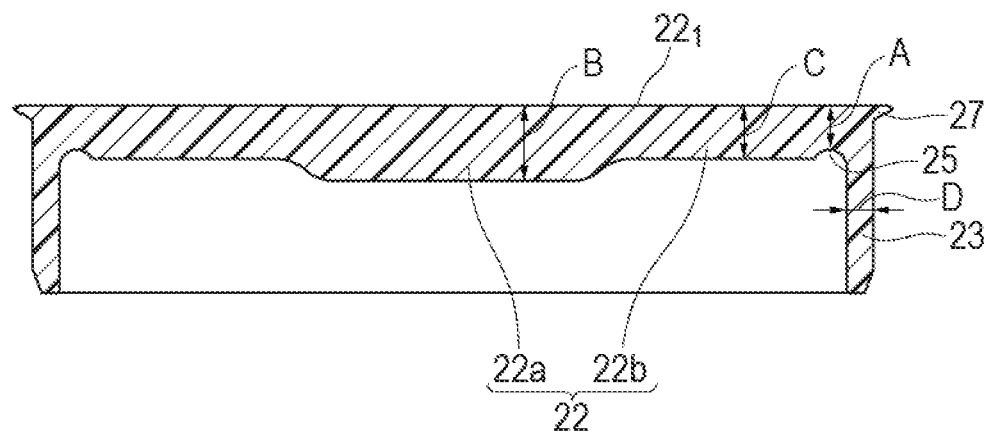
FIG. 6 is a cross-sectional view of the cap according to the embodiment (a cross-sectional view of a portion where a protrusion is not present).

As illustrated in a bottom view of FIG. 5, the center portion 22a has a circular shape with a small diameter, and the peripheral portion 22b has a ring shape surrounding the center portion 22a. The center portion 22a has a constant thickness B within the circular-shaped area. The peripheral portion 22b has a constant thickness C within the ring-shaped area. A ring-shaped groove 25 is provided at an edge of an undersurface of the top surface portion 22 (that is, an edge of the peripheral portion 22b). As illustrated in FIG. 6, the groove 25 has an arc shape in cross section. A thickness A of the top surface portion 22 in a portion where the groove 25 is present is not particularly limited, but is preferable to be greater than a thickness D, which is described below, of the side surface portion 23.

As illustrated in FIGS. 3 and 4, the side surface portion 23 has a cylindrical shape. The side surface portion 23 is not provided with a slit. If the side surface portion 23 is provided with a slit, the top surface portion 22 easily deforms elastically with the elastic deformation of the side surface portion 23. The reason why the side surface portion 23 is formed into a perfect cylindrical shape is to prevent the elastic deformation. As illustrated in FIG. 6, the side surface portion 23 has the constant thickness D. As illustrated in FIG. 5, an outer diameter $\phi 2$ of the side surface portion 23 is smaller than the inner diameter $\phi 1$ of the counterbore portion 5a of the hole 5.

The thickness D of the side surface portion 23 is less than the thickness C of the peripheral portion 22b of the top surface portion 22. There is a relationship where the thickness D of the side surface portion 23<the thickness C of the peripheral portion 22b of the top surface portion 22<the thickness B of the center portion 22a of the top surface portion 22. The thickness of each portion of the cap 21 has a correlation with stiffness of the portion. The stiffness of the side surface portion 23<the stiffness of the peripheral portion 22b of the top surface portion 22<the stiffness of the center portion 22a of the top surface portion 22 holds.

As illustrated in FIG. 4, an upper end portion of an outer peripheral surface 23a of the side surface portion 23 is provided with the flange 27. When the cap 21 is driven into the hole 5, the flange 27 is placed on the chamfered portion $5a_1$ of the counterbore portion 5a (refer to FIG. 9B). A lower end portion of the outer peripheral surface 23a of the side surface portion 23 is provided with an introduction-purpose tapered surface 23b, which facilitates the introduction of the cap 21 into the hole 5.

As illustrated in FIGS. 3 and 4, the plurality of protrusions 24 (six protrusions 24 in the embodiment) is placed apart from each other at equal pitch in a circumferential direction on the outer peripheral surface 23a of the side surface portion 23. The protrusion 24 is present from the upper end portion to an axially middle portion of the outer peripheral surface 23a of the side surface portion 23. The protrusion 24 is not necessarily present up to the middle portion, but may be present, for example, only at the upper end portion. The protrusion 24 does not extend axially to the introduction-purpose tapered surface 23b, and is present above the introduction-purpose tapered surface 23b. As illustrated in FIG. 5, an area, in which the plurality of protrusions 24 is present (expressed as $\alpha$ degrees×6 pieces/360 degrees in FIG. 5), of the outer peripheral surface 23a of the side surface portion 23 is equal to or less than 30%.

As illustrated in FIG. 5, an outer peripheral surface 24a of the protrusion 24 is located on a concentric circle with the outer peripheral surface 23a of the side surface portion 23. An outer diameter $\phi 3$ of the outer peripheral surface 24a of the protrusion 24 is larger than the inner diameter $\phi 1$ of the counterbore portion 5a of the hole 5 (refer to FIGS. 9A and 9B). Hence, the protrusion 24 is driven with interference into the counterbore portion 5a of the hole 5. As illustrated in FIG. 3, the protrusion 24 has a square shape in side view, but the shape of the protrusion 24 is not particularly limited, and can also be formed into a triangle. A wedge-shaped inclined surface 24b is formed at a lower end portion of each protrusion 24.

Figure 7:
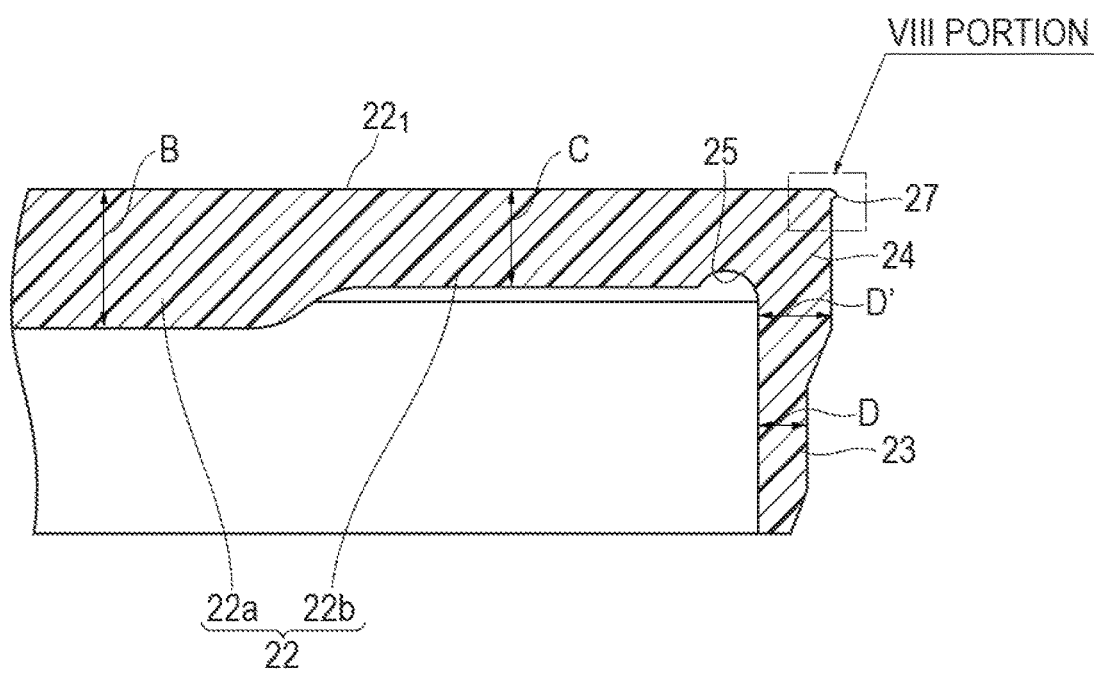
FIG. 7 is a cross-sectional view of the cap according to the embodiment (a cross-sectional view of a portion where the protrusion is present).
Figure 8:
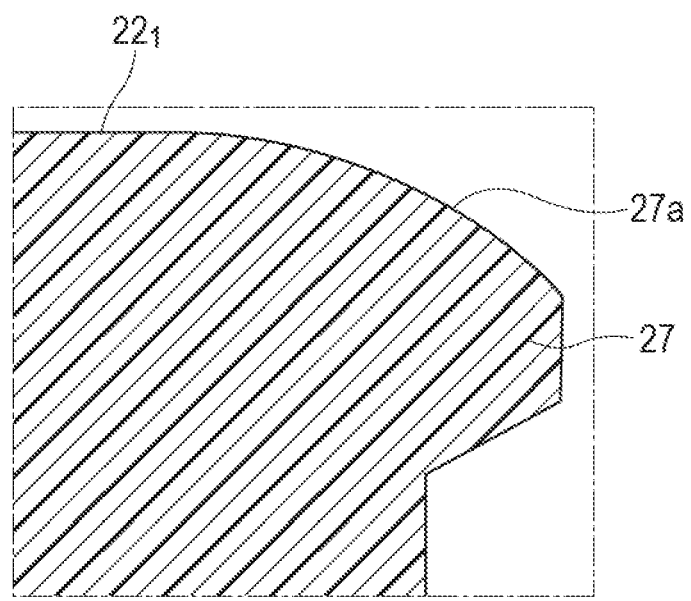
FIG. 8 is an enlarged view of a VIII portion of FIG. 7.

FIG. 7 illustrates a cross-sectional view of the cap 21 in a portion where the protrusion 24 is present. FIG. 8 illustrates an enlarged view of a VIII portion of FIG. 7. As illustrated in FIG. 7, a thickness D' of the side surface portion 23 in the portion where the protrusion 24 is present is also less than the thickness C of the peripheral portion 22b. As illustrated in the enlarged view of FIG. 8, a chamfered portion 27a of an arc shape in cross section is provided on the top surface of the flange 27. The chamfered portion 27a is continuous to the flat top surface $22_1$ of the top surface portion 22.

Figure 9A:
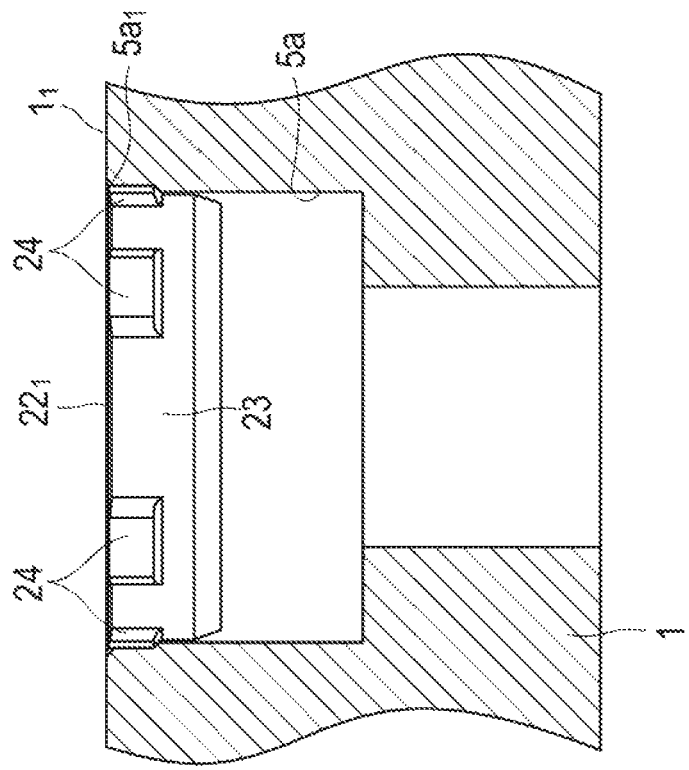
FIGS. 9A and 9B are process drawings of a driving operation of the cap according to the embodiment (FIG. 9A illustrates a state where the cap has been temporarily placed on a fastening member insertion hole, and FIG. 9B illustrates a state where the cap has been driven into the fastening member insertion hole).
Figure 9B:
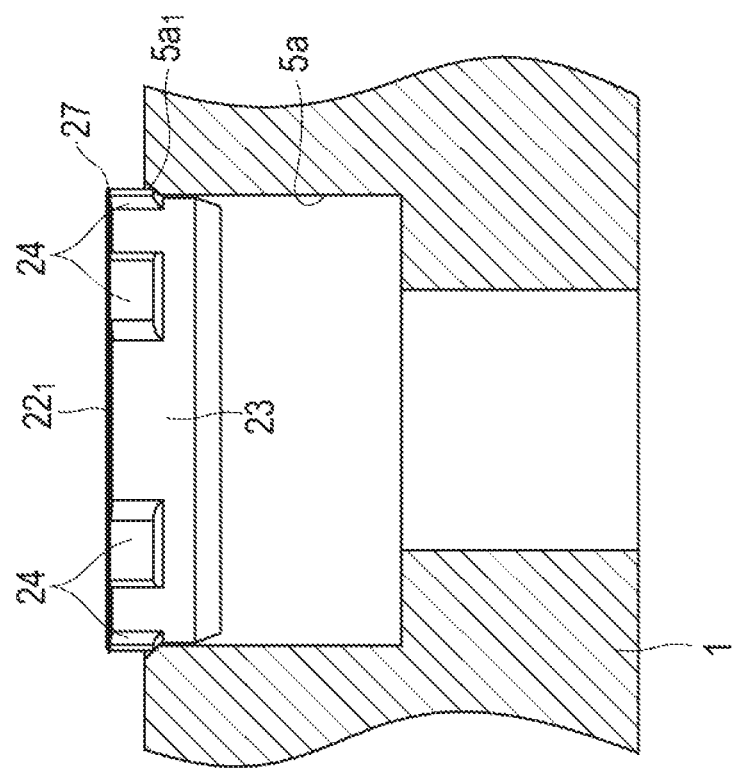

FIGS. 9A and 9B illustrate process drawings of when the cap 21 according to the embodiment is driven into the hole 5. In FIGS. 9A and 9B, the bolt is omitted, but the bolt 4 actually sits in the hole 5.

As illustrated in FIG. 9A, firstly, the cap 21 is introduced into the counterbore portion 5a of the hole 5, and temporarily placed on the counterbore portion 5a. The outer diameter $\phi 3$ of the protrusion 24 is larger than the inner diameter $\phi 1$ of the counterbore portion 5a. Accordingly, the cap 21 is temporarily placed on the counterbore portion 5a in a state where the protrusion 24 is caught by the chamfered portion $5a_1$ of the counterbore portion 5a. A portion, which is below the protrusion 24, of the side surface portion 23 of the cap 21 is inserted into the counterbore portion 5a.

Next, as illustrated in FIG. 9B, the cap 21 is driven into the counterbore portion 5a. The cap 21 in the temporarily placed state is stable. Accordingly, the cap 21 is not inclined while being driven. It is preferable to drive the cap 21 by placing a patch fitting whose top surface and undersurface are flat on the cap 21, and hammering the patch fitting with a plastic hammer. However, the cap 21 can also be directly driven with the plastic hammer. Even if the cap 21 is driven, the cap 21 does not come into contact with the bolt 4 (not illustrated), and a gap is formed between the cap 21 and the bolt 4.

The cap 21 is driven into the counterbore portion 5a until the top surface $22_1$ of the top surface portion 22 becomes the same level with a top surface $1_1$ of the guide rail 1. The plurality of protrusions 24 has interference. Accordingly, the plurality of protrusions 24 is pressed against an inner surface of the counterbore portion 5a to fix the cap 21 to the counterbore portion 5a. The cap 21 is driven and accordingly the flange 27 of the cap 21 is placed on the chamfered portion $5a_1$ of the counterbore portion 5a.

According to the cap 21 of the embodiment, the following effects are exerted. When the protrusions 24 are pressed against the inner surface of the counterbore portion 5a, the side surface portion 23 deforms elastically since the stiffness of the side surface portion 23 is lower than the stiffness of the top surface portion 22. A spring function is provided to the side surface portion 23. Accordingly, it is possible to prevent the protrusion 24 from being scraped and a burr from being generated, and the fixing force of the cap 21 to the counterbore portion 5a can also be increased. Moreover, the protrusion 24 is provided only at the upper end portion, or from the upper end portion to the middle portion, of the outer peripheral surface 23a of the side surface portion 23. Accordingly, when the cap 21 is temporarily placed, the cap 21 can be stabilized. In addition, the spring function can also be provided to the side surface portion 23 below the protrusion 24.

The stiffness of the center portion 22a of the top surface portion 22 of the cap 21 is higher than the stiffness of the peripheral portion 22b. Accordingly, the center portion 22a of the top surface portion 22 of the cap 21 can be prevented from rising, and the top surface $22_1$ of the top surface portion 22 of the cap 21 can be maintained flat. Moreover, it is also possible to compensate a lack of elastic deformation of the side surface portion 23 with elastic deformation of the peripheral portion 22b of the top surface portion 22.

The stiffness of the peripheral portion 22b of the top surface portion 22 is higher than the stiffness of the side surface portion 23. Accordingly, it is possible to make the elastic deformation of the side surface 23 of the cap 21 hardly transmitted to the top surface portion 22.

The ring-shaped groove 25 is provided at the edge of the undersurface of the top surface portion 22. Accordingly, it is possible to make the elastic deformation of the side surface portion 23 of the cap 21 hardly transmitted to the top surface portion 22.

The side surface portion 23 is provided with the flange 27 that is placed on the chamfered portion $5a_1$ of the counterbore portion 5a. Accordingly, even if the seal 13 of the carriage 2 travels over the cap 21, it is possible to prevent the cap 21 from sinking.

The chamfered portion 27a of an arc shape in cross section is provided on the top surface of the flange 27. Accordingly, even if the seal 13 of the carriage 2 travels over the cap 21, it is possible to prevent the seal 13 from being caught by the flange 27.

Of the entire circumference of the outer peripheral surface 23a of the side surface portion 23, the area where the plurality of protrusions 24 is present is equal to or less than 30%. Accordingly, it is easy to deform the side surface portion 23 elastically.

Second Embodiment

Figure 10:
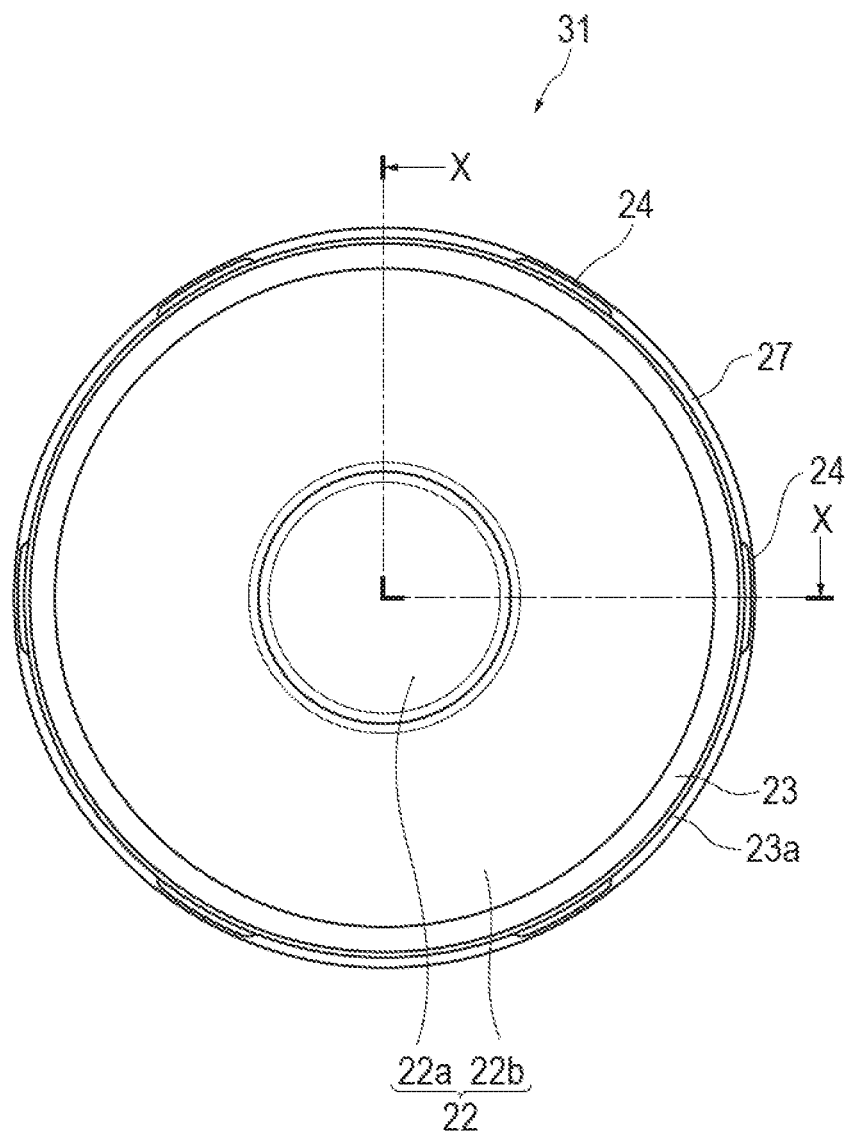
FIG. 10 is a bottom view of a cap according to a second embodiment of the present invention.
Figure 11:
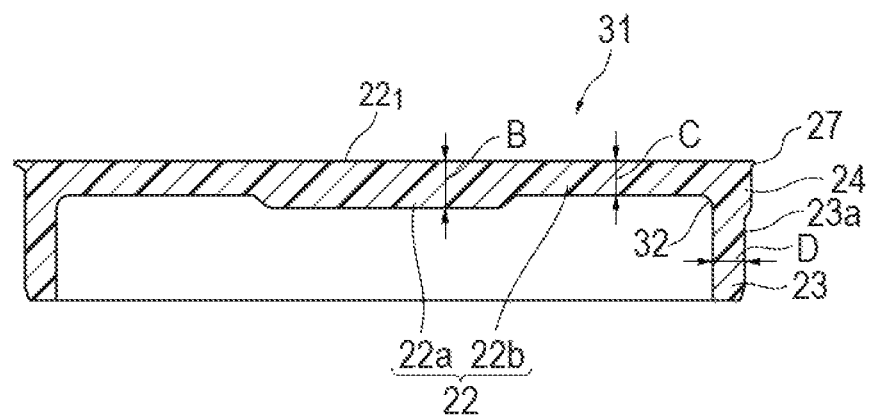
FIG. 11 is a cross-sectional view taken along line X-X of FIG. 10.

FIG. 10 illustrates a bottom view of a cap 31 according to a second embodiment of the present invention. FIG. 11 illustrates a cross-sectional view taken along line X-X of FIG. 10. The cap 31 according to the second embodiment also includes a disc-shaped top surface portion 22, a cylindrical side surface portion 23 hanging down from the top surface portion 22, and a plurality of protrusions 24 provided on an outer peripheral surface of the side surface portion 23. The top surface portion 22 has a thick center portion 22a, and a peripheral portion 22b that is thinner than the center portion 22a. A flange 27 is provided at an edge of the top surface portion 22. The plurality of protrusions 24 (six protrusions 24 in the embodiment) is provided at equal pitch in a circumference direction on the outer peripheral surface of the side surface portion 23. As in the first embodiment, the protrusion 24 is present from an upper end portion to an axially middle portion of an outer peripheral surface 23a of the side surface portion 23.

In the second embodiment, a relationship between a thickness B of the center portion 22a of the top surface portion 22, a thickness C of the peripheral portion 22b of the top surface portion 22, and a thickness D of the side surface portion 23 (the thickness D of a portion where the protrusion 24 is not present) is different from that of the first embodiment. Specifically, the thickness D of the side surface portion 23 is set to be less than the thickness B of the center portion 22a of the top surface portion 22, and be equal to or greater than the thickness C of the peripheral portion 22b. In other words, there is a relationship where C≤D<B.

Moreover, a ring-shaped groove 25 is not provided at an edge of an undersurface of the top surface portion 22 (that is, an edge of the peripheral portion 22b). The peripheral portion 22b and the side surface portion 23 are coupled by a coupling portion 32 of an arc shape in cross section.

The other configurations of the center portion 22a, the peripheral portion 22b, and the side surface portion 23 of the top surface portion 22 are substantially the same as those of the cap 21 according to the first embodiment. Accordingly, the same reference signs are assigned to them and detailed descriptions thereof are omitted.

According to the cap 31 of the second embodiment, the following effects are exerted. When the protrusions 24 are pressed against an inner surface of the counterbore portion 5a, the side surface portion 23 deforms elastically since the thickness D of the side surface portion 23 is less than the thickness B of the center portion 22a of the top surface portion 22. A spring function is provided to the side surface portion 23. Accordingly, it is possible to reduce the protrusion 24 from being scraped and a burr from being generated.

The thickness B of the center portion 22a of the top surface portion 22 of the cap 31 is greater than the thickness C of the peripheral portion 22b. Accordingly, it is possible to prevent the center portion 22a of the top surface portion 22 of the cap 31 from rising.

The thickness D of the side surface portion 23 is equal to or greater than the thickness C of the peripheral portion 22b of the top surface portion 22. Accordingly, it is possible to prevent the side surface portion 23 provided with the spring function from deforming elastically. Consequently, the unmating force and the holding force are increased. The unmating force is a measure of the hardness to remove the cap 31, and is measured by carrying out an unmating test on the cap 31. The holding force is a measure of the hardness for the cap 31 to sink into the counterbore portion 5a, and is measured by carrying out an indentation test on the cap 31. The unmating force and the holding force of the cap 31 are increased. Accordingly, it is possible to make the cap highly resistant to environment such as high-temperature environment or low-temperature environment.

The edge of the undersurface of the top surface portion 22 is not provided with the ring-shaped groove 25 (refer to FIG. 6), but is provided with the arc-shaped coupling portion 32. Accordingly, it is possible to further prevent the deformation of the side surface portion 23. Consequently, the unmating force and the holding force are increased.

Third Embodiment

Figure 12:
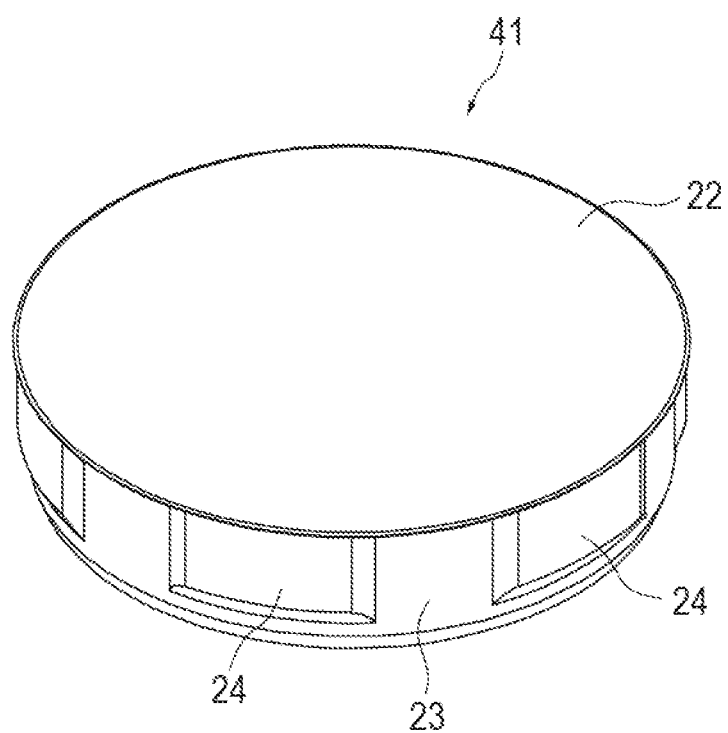
FIG. 12 is a perspective view of a top surface side of a cap according to a third embodiment of the present invention.
Figure 13:
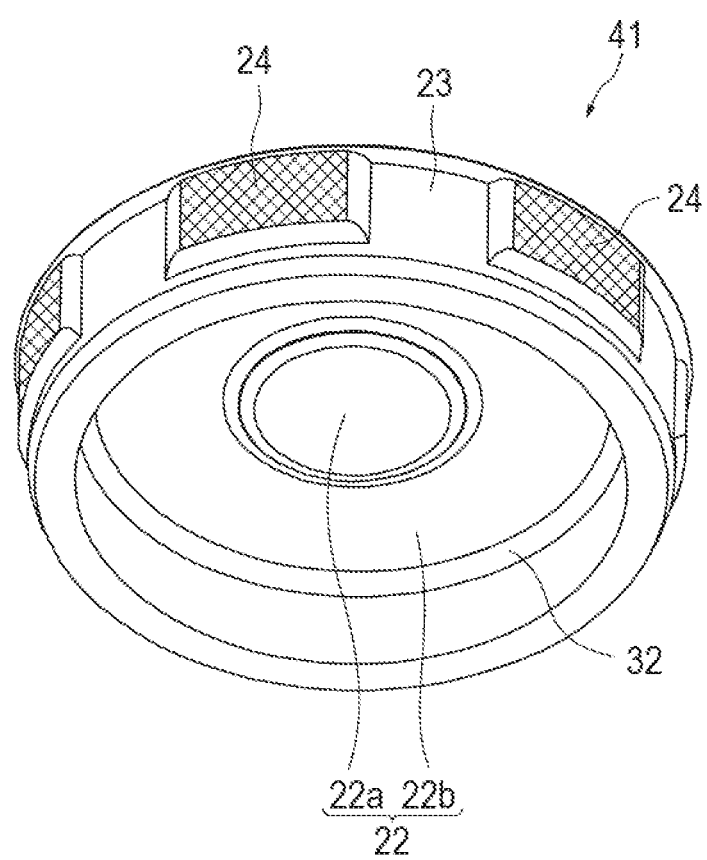
FIG. 13 is a perspective view of a bottom surface side of the cap according to the third embodiment of the present invention.

FIG. 12 illustrates a perspective view of a top surface side of a cap 41 according to a third embodiment. FIG. 13 illustrates a perspective view of a bottom surface side of the cap 41. The cap 41 also includes a disc-shaped top surface portion 22, a cylindrical side surface portion 23 hanging down from the top surface portion 22, and a plurality of protrusions 24 provided on an outer peripheral surface of the side surface portion 23.

Figure 14:
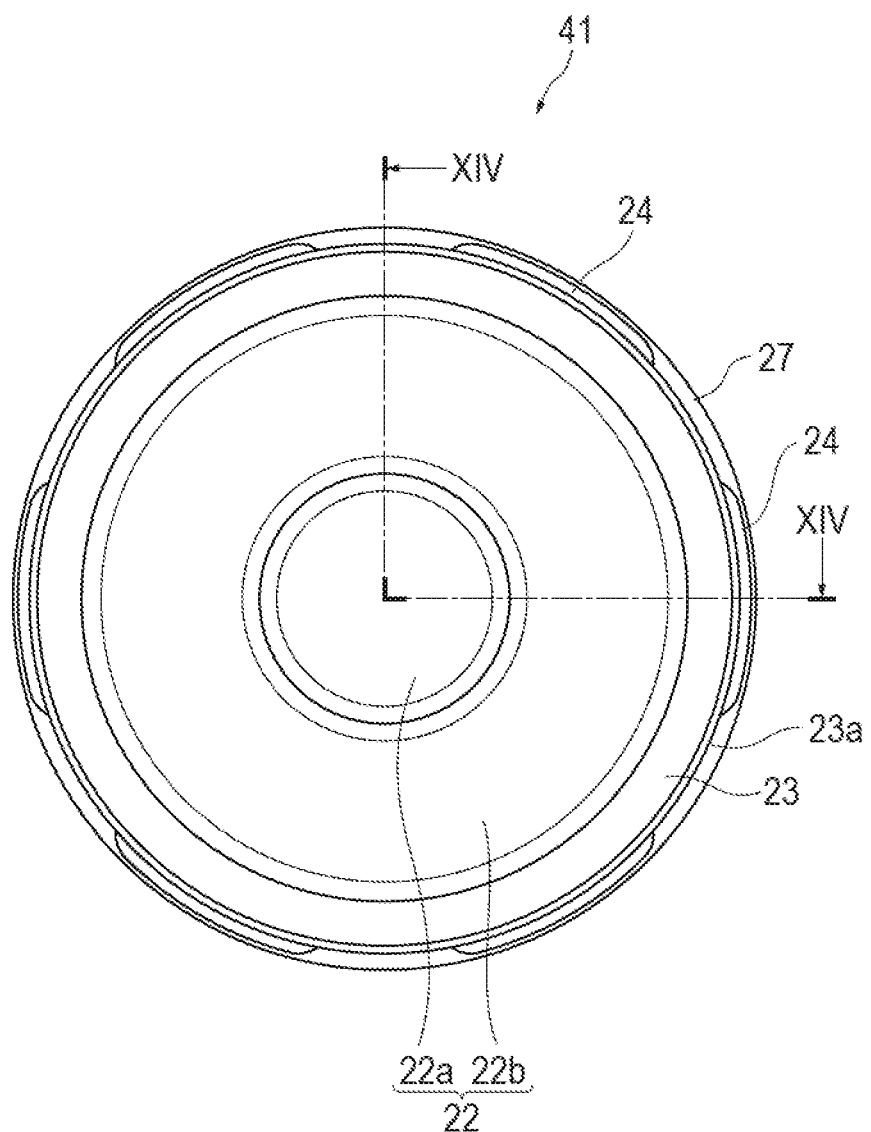
FIG. 14 is a bottom view of the cap according to the third embodiment of the present invention.
Figure 15:
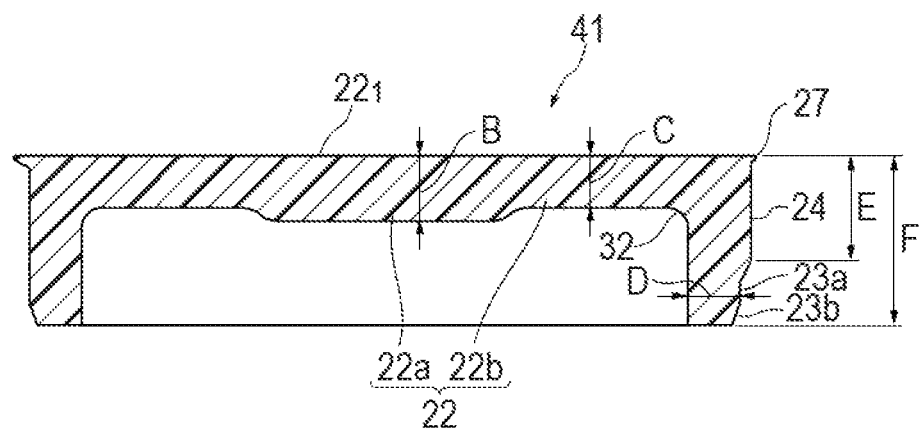
FIG. 15 is a cross-sectional view taken along line XIV-XIV of FIG. 14.

FIG. 14 illustrates a bottom view of the cap 41. FIG. 15 illustrates a cross-sectional view taken along line XIV-XIV of FIG. 14. The area (height×width) of the protrusion 24 is larger in the cap 41 than that in the caps 21 and 31 according to the first and second embodiments to further increase the unmating force and the holding force. The protrusion 24 is present from an upper end portion to an axially middle portion of an outer peripheral surface 23a of the side surface portion 23. A height E of the protrusion from a top surface $22_1$ of the top surface portion 22 to a lower end of the protrusion 24 (that is, a lower end of a portion, which comes into contact with a counterbore portion 5a, of the protrusion 24) is set to be equal to or greater than one-half, approximately two-third in the embodiment, of an overall height F of the cap 41. However, the protrusion 24 does not extend axially to an introduction-purpose tapered surface 23b, and is present above the introduction-purpose tapered surface 23b.

The plurality of, six in the embodiment, protrusions 24 is provided at equal pitch in a circumferential direction. Of the entire circumference of the outer peripheral surface of the side surface portion 23, the total area where the six protrusions 24 come into contact with the counterbore portion 5a (a portion indicated by cross-hatching in FIG. 13) is equal to or greater than 20% and equal to or less than 60%, preferably equal to or greater than 20% and equal to or less than 50%.

As in the cap 31 according to the second embodiment, the top surface portion 22 has a thick center portion 22a, and a peripheral portion 22b that is thinner than the center portion 22a. A flange 27 is provided at an edge of the top surface portion 22. A thickness D of the side surface portion 23 is set to be less than a thickness B of the center portion 22a of the top surface portion 22, and be equal to or greater than a thickness C of the peripheral portion 22b. In other words, there is a relationship where C≤D<B. The peripheral portion 22b and the side surface portion 23 are coupled by a coupling portion 32 of an arc shape in cross section.

The other configurations of the center portion 22a, the peripheral portion 22b, and the side surface portion 23 of the top surface portion 22 are substantially the same as those of the cap 21 according to the first embodiment. Accordingly, the same reference signs are assigned to them, and detailed descriptions thereof are omitted.

According to the cap 41 of the third embodiment, the following effects are exerted. The height E of the protrusion 24 is equal to or greater than one-half the overall height F of the cap 41. Accordingly, the area where the protrusion 24 comes into contact with the counterbore portion 5a can be increased. Consequently the unmating force and the holding force can be increased.

Of the entire circumference of the outer peripheral surface of the side surface portion 23, the total area where the protrusions 24 come into contact with the counterbore portion 5a is equal to or greater than 20% and equal to or less than 60%. Accordingly, the area where the protrusions 24 come into contact with the counterbore portion 5a can be increased. Consequently, the unmating force and the holding force can be increased. If the total area is less than 20%, there is a problem that required unmating force and holding force cannot be secured. Moreover, if the total area exceeds 60%, there is a problem that the protrusion 24 is scraped and a burr is generated.

The present invention is not limited to the embodiments, and can be modified in various manners within the scope that does not change the gist of the present invention.

In terms of the shape of the cap, another shape can be employed within the scope that does not change the gist of the present invention. For example, the number of the protrusions can be set at any number equal to or greater than two. In terms of the shape of the protrusion, a circle, a triangle, a pentagon, and the like other than a square can be employed.

If the cap is small, the area where the plurality of protrusions is present of the entire circumference of the outer peripheral surface of the side surface portion can also be set at approximately 50%.

The material of the cap is not limited to resin, and may be metal such as stainless, aluminum, and brass.

The description is based on Japanese Patent Application No. 2016-061077 filed on Mar. 25, 2016, and Japanese Patent Application No. 2017-057603 filed on Mar. 23, 2017, the entire contents of which are incorporated herein.

REFERENCE SIGNS LIST

1 Guide rail
5 Fastening member insertion hole
5$a_1$ Chamfered portion of a counterbore portion of the fastening member insertion hole
21, 31, 41 Cap
22 Top surface portion
22a Center portion
22b Peripheral portion
23 Side surface portion
23a Outer peripheral surface of the side surface portion
24 Protrusion
25 Ring-shaped groove
27 Flange
27a Chamfered portion of the flange
B Thickness of the center portion of the top surface portion (thickness of the top surface portion)
C Thickness of the peripheral portion of the top surface portion
D Thickness of the side surface portion between protrusions

The invention claimed is:

1. A cap for blocking a fastening member insertion hole of a guide rail of a motion guide apparatus, the cap for a motion guide apparatus comprising:
a disc-shaped top surface portion;
a cylindrical side surface portion hanging down from the top surface portion; and
a plurality of protrusions provided on an outer peripheral surface of the side surface portion, wherein
the plurality of protrusions is apart from each other in a circumferential direction on the outer peripheral surface of the side surface portion, and is present at an upper end portion, or from the upper end portion to an axially middle portion, of the outer peripheral surface,
a thickness of the side surface portion between the protrusions is less than a thickness of the top surface portion,
the top surface portion includes a center portion, and a peripheral portion thinner than the center portion, and
the peripheral portion is thinner than the center portion within an entire area of the ring-shaped peripheral portion.

2. The cap for a motion guide apparatus according to claim 1, wherein a ring-shaped groove is provided at an edge of an undersurface of the top surface portion.

3. The cap for a motion guide apparatus according to claim 2, wherein the upper end portion of the outer peripheral surface of the side surface portion is provided with a flange to be placed on a chamfered portion of the fastening member insertion hole.

4. The cap for a motion guide apparatus according to claim 3, wherein a chamfered portion of an arc shape in cross section is provided on a top surface of the flange.

5. The cap for a motion guide apparatus according to claim 2, wherein a height of the protrusion from a top surface of the top surface portion to a lower end of the protrusion is equal to or greater than one-half an overall height of the cap.

6. The cap for a motion guide apparatus according to claim 2, wherein, of an entire circumference of the outer peripheral surface of the side surface portion, a total area where the plurality of protrusions comes into contact with the fastening member insertion hole is equal to or greater than 20% and equal to or less than 60%.

7. The cap for a motion guide apparatus according to claim 2, wherein the thickness of the side surface portion between the protrusions is less than the thickness of the center portion of the top surface portion.

8. The cap for a motion guide apparatus according to claim 7, wherein the thickness of the side surface portion between the protrusions is equal to or greater than a thickness of the peripheral portion of the top surface portion.

9. The cap for a motion guide apparatus according to claim 7, wherein the upper end portion of the outer peripheral surface of the side surface portion is provided with a flange to be placed on a chamfered portion of the fastening member insertion hole.

10. The cap for a motion guide apparatus according to claim 9, wherein a chamfered portion of an arc shape in cross section is provided on a top surface of the flange.

11. The cap for a motion guide apparatus according to claim 7, wherein a height of the protrusion from a top surface of the top surface portion to a lower end of the protrusion is equal to or greater than one-half an overall height of the cap.

12. The cap for a motion guide apparatus according to claim 7, wherein, of an entire circumference of the outer peripheral surface of the side surface portion, a total area where the plurality of protrusions comes into contact with the fastening member insertion hole is equal to or greater than 20% and equal to or less than 60%.

13. The cap for a motion guide apparatus according to claim 1, wherein the upper end portion of the outer peripheral surface of the side surface portion is provided with a flange to be placed on a chamfered portion of the fastening member insertion hole.

14. The cap for a motion guide apparatus according to claim 13, wherein a chamfered portion of an arc shape in cross section is provided on a top surface of the flange.

15. The cap for a motion guide apparatus according to claim 14, wherein a height of the protrusion from a top surface of the top surface portion to a lower end of the protrusion is equal to or greater than one-half an overall height of the cap.

16. The cap for a motion guide apparatus according to claim 14, wherein, of an entire circumference of the outer peripheral surface of the side surface portion, a total area where the plurality of protrusions comes into contact with the fastening member insertion hole is equal to or greater than 20% and equal to or less than 60%.

17. The cap for a motion guide apparatus according to claim 13, wherein a height of the protrusion from a top surface of the top surface portion to a lower end of the protrusion is equal to or greater than one-half an overall height of the cap.

18. The cap for a motion guide apparatus according to claim 13, wherein, of an entire circumference of the outer peripheral surface of the side surface portion, a total area where the plurality of protrusions comes into contact with the fastening member insertion hole is equal to or greater than 20% and equal to or less than 60%.

19. The cap for a motion guide apparatus according to claim 1, wherein a height of the protrusion from a top surface of the top surface portion to a lower end of the protrusion is equal to or greater than one-half an overall height of the cap.

20. The cap for a motion guide apparatus according to claim 1, wherein, of an entire circumference of the outer peripheral surface of the side surface portion, a total area where the plurality of protrusions comes into contact with the fastening member insertion hole is equal to or greater than 20% and equal to or less than 60%.

* * * * *